United States Patent
Chu et al.

(10) Patent No.: US 9,984,637 B2
(45) Date of Patent: May 29, 2018

(54) ARRAY SUBSTRATE AND MANUFACTURING METHOD THEREOF, DISPLAY PANEL AND DRIVING METHOD THEREOF

(71) Applicants: BOE Technology Group Co., Ltd., Beijing (CN); Hefei BOE Optoelectronics Technology Co., Ltd., Hefei (CN)

(72) Inventors: Hao Chu, Beijing (CN); Yue Shi, Beijing (CN); Kaidi Fang, Beijing (CN)

(73) Assignees: BOE Technology Group Co., Ltd., Beijing (CN); Hefei BOE Optoelectronics Technology Co., Ltd., Hefei (CN)

( * ) Notice: Subject to any disclaimer, the term of this patent is extended or adjusted under 35 U.S.C. 154(b) by 0 days. days.

(21) Appl. No.: 15/511,461

(22) PCT Filed: Feb. 18, 2016

(86) PCT No.: PCT/CN2016/074029
§ 371 (c)(1),
(2) Date: Mar. 15, 2017

(87) PCT Pub. No.: WO2017/041440
PCT Pub. Date: Mar. 16, 2017

(65) Prior Publication Data
US 2017/0287421 A1    Oct. 5, 2017

(30) Foreign Application Priority Data
Sep. 11, 2015  (CN) .......................... 2015 1 0580609

(51) Int. Cl.
*G09G 3/36*    (2006.01)
*G02F 1/1368*    (2006.01)
(Continued)

(52) U.S. Cl.
CPC ......... *G09G 3/3614* (2013.01); *G02F 1/1368* (2013.01); *G02F 1/13439* (2013.01);
(Continued)

(58) Field of Classification Search
CPC .. G09G 3/3614; G09G 3/3677; G09G 3/3659; G09G 2310/0208;
(Continued)

(56) References Cited

U.S. PATENT DOCUMENTS 5,680,190 A * 10/1997 Michibayashi ... G02F 1/134309
                                                          349/140
6,104,450 A *  8/2000 Hiraishi ............ G02F 1/136213
                                                           349/48
(Continued)

FOREIGN PATENT DOCUMENTS

CN         1591099 A    3/2005
CN       101441379 A    5/2009
(Continued)

OTHER PUBLICATIONS

Jun. 7, 2016—International Search Report and Written Opinion Appn PCT/CN2016/074029 with Eng Tran.
(Continued)

*Primary Examiner* — Mihir K Rayan
(74) *Attorney, Agent, or Firm* — Banner & Witcoff, Ltd.

(57) ABSTRACT

An array substrate and a manufacturing method thereof, and a display panel including the array substrate and a driving method thereof are provided. Each of the sub-pixel units of the array substrate includes a first thin film transistor and a second thin film transistor; the first thin film transistor includes a first gate electrode, a first source electrode and a first drain electrode; the second thin film transistor includes a second gate electrode, a second source electrode and a second drain electrode; each of the sub-pixel unit further
(Continued)

---

In a first frame, inputting scan signals to the first gate lines 204 line by line, so as to switch on the first thin film transistors 201 row by row, and inputting positive polarity data signals to the first pixel electrode 202 connected to the first thin film transistors 201 which are switched on, through the data lines 205 electrically connected to the first source electrodes 2012. — S20

In a second frame, inputting scan signals to the second gate lines 208 line by line, so as to switch on the second thin film transistor 206 row by row, and inputting negative polarity data signals to the second pixel electrodes 207 connected to the second thin film transistors 206 which are switched on, through the data lines 205 electrically connected to the second source electrodes 2062. — S21 includes a first pixel electrode electrically connected to the first drain electrode, a second pixel electrode electrically connected to the second drain electrode; and the first pixel electrode and the second pixel electrode are disposed in different layers and insulated with each other.

13 Claims, 6 Drawing Sheets

(51) Int. Cl.
*G02F 1/1362* (2006.01)
*G02F 1/1343* (2006.01)

(52) U.S. Cl.
CPC .. *G02F 1/134336* (2013.01); *G02F 1/136286* (2013.01); *G09G 3/3659* (2013.01); *G09G 3/3677* (2013.01); G09G 2300/0426 (2013.01); G09G 2300/0823 (2013.01); G09G 2310/0208 (2013.01); G09G 2320/0247 (2013.01); G09G 2320/0257 (2013.01)

(58) Field of Classification Search
CPC ... G09G 2310/0823; G09G 2320/0257; G09G 2300/0426; G02F 1/136286; G02F 1/13439; G02F 1/134336; G02F 1/1368
See application file for complete search history.

(56) References Cited

U.S. PATENT DOCUMENTS

| | | | | |
|---|---|---|---|---|
| 6,636,287 B1* | 10/2003 | McKnight | ......... | G02F 1/133371 349/113 |
| 2003/0090448 A1* | 5/2003 | Tsumura | ........... | G02F 1/134363 345/87 |
| 2006/0119559 A1* | 6/2006 | Jung | .................... | G09G 3/3614 345/96 |
| 2006/0274009 A1* | 12/2006 | Lee | ................... | G02F 1/136213 345/92 |
| 2006/0286703 A1* | 12/2006 | Um | ...................... | G02F 1/13624 438/30 |
| 2007/0146563 A1* | 6/2007 | Yun | ....................... | G02F 1/1337 349/36 |
| 2009/0091669 A1* | 4/2009 | Wang | ................ | G02F 1/133707 349/37 |
| 2009/0185125 A1 | 7/2009 | Hida et al. | | |
| 2012/0274889 A1* | 11/2012 | Sugisaka | ............... | G02F 1/1368 349/139 |

FOREIGN PATENT DOCUMENTS

| | | |
|---|---|---|
| CN | 102566155 A | 7/2012 |
| CN | 102591080 A | 7/2012 |
| CN | 102621749 A | 8/2012 |
| CN | 202443224 U | 9/2012 |
| CN | 102937765 A | 2/2013 |
| CN | 103336393 A | 10/2013 |
| CN | 103913904 A | 7/2014 |
| CN | 104062814 A | 9/2014 |
| CN | 105068348 A | 11/2015 |

OTHER PUBLICATIONS

Jul. 17, 2017—(CN) First Office Action Appn 201510580609.5 with English Tran.

* cited by examiner

Forming a first thin film transistor 201 and a second thin film transistor 206 in each sub-pixel unit 20 in a same process, wherein the first thin film transistor 201 comprises a first gate electrode 2011, a first source electrode 2012 and a first drain electrode 2013, and the second thin film transistor 206 comprises a second gate electrode 2061, a second source electrode 2062 and a second drain electrode 2063. — S10

Forming the first pixel electrode 202 electrically connected to the first drain electrode 2013, and the second pixel electrode 207 electrically connected to the second drain electrode 2063, wherein the first pixel electrode 202 and the second pixel electrode 207 are disposed in different layers and insulated from each other. — S11

Fig.10

In a first frame, inputting scan signals to the first gate lines 204 line by line, so as to switch on the first thin film transistors 201 row by row, and inputting positive polarity data signals to the first pixel electrode 202 connected to the first thin film transistors 201 which are switched on, through the data lines 205 electrically connected to the first source electrodes 2012. — S20

In a second frame, inputting scan signals to the second gate lines 208 line by line, so as to switch on the second thin film transistor 206 row by row, and inputting negative polarity data signals to the second pixel electrodes 207 connected to the second thin film transistors 206 which are switched on, through the data lines 205 electrically connected to the second source electrodes 2062. — S21

Fig.11

In the first frame, inputting scan signals to second gate lines 208 line by line, so as to switch on the second thin film transistors 206 row by row, and inputting positive polarity data signals to the second pixel electrodes 207 connected to the second thin film transistors 206 which are switched on, through the data lines 205 electrically connected to the second source electrodes 2062. — S30

In the second frame, inputting scan signals to first gate lines 204 line by line, so as to switch on the first thin film transistors 201 row by row, and inputting negative polarity data signals to the first pixel electrodes 202 connected to the first thin film transistors 201 which are switched on, through the data lines 205 electrically connected to the first source electrodes 2012. — S31

Fig.12

ARRAY SUBSTRATE AND MANUFACTURING METHOD THEREOF, DISPLAY PANEL AND DRIVING METHOD THEREOF

The application is a U.S. National Phase Entry of International Application No. PCT/CN2016/074029 filed on Feb. 18, 2016, designating the United States of America and claiming priority to Chinese Patent Application No. 201510580609.5 filed on Sep. 11, 2015. The present application claims priority to and the benefit of the above-identified applications and the above-identified applications are incorporated by reference herein in their entirety.

TECHNICAL FIELD

Embodiments of the present disclosure relate to an array substrate and a manufacturing method thereof, and a display panel and a driving method thereof.

BACKGROUND

Liquid crystal displays (LCD) have advantages such as small size, low power consumption and no radiation, and play a leading role in the display market nowadays.

Specifically, a liquid crystal display comprises a display panel and a backlight; and a display panel comprises an array substrate, an opposite substrate, and a liquid crystal layer disposed between the array substrate and the opposite substrate.

However, in processes of manufacturing an array substrate, the influences of process parameters, materials, impurity ions and the like can result in problems such as flicker, residual image and the like, and thus the product yield is affected.

SUMMARY

Embodiments of the present disclosure provide an array substrate and a manufacturing method thereof, and a display panel and a driving method thereof. The working voltages of liquid crystals in positive and negative frames tend to be equal to solve problems such as flicker, residual image and the like.

In order to achieve the purpose mentioned above, embodiments of the present disclosure adopt the following technical solutions.

In a first aspect, an array substrate is provided, and the array substrate comprises a base substrate and a plurality of sub-pixel units disposed in array on the base substrate; each of the sub-pixel units comprises a first thin film transistor and a second thin film transistor; the first thin film transistor comprises a first gate electrode, a first source electrode and a first drain electrode; the second thin film transistor comprises a second gate electrode, a second source electrode and a second drain electrode; each of the sub-pixel units further comprises a first pixel electrode electrically connected to the first drain electrode, a second pixel electrode electrically connected to the second drain electrode; and the first pixel electrode and the second pixel electrode are disposed in different layers and insulated from each other. In some embodiments, a plurality of first slits are provided in the first pixel electrode; a plurality of second slits are provided in the second pixel electrode; and the first slit and the second slit are disposed staggered with each other.

In the first embodiment of the first aspect, the first gate electrode is electrically connected to a first gate line; the second gate electrode is electrically connected to a second gate line; the first source electrode is electrically connected to a first data line; and the second source electrode is electrically connected to a second data line.

Combined with the first embodiment of the first aspect, in the second embodiment, the first data line and the second data line, which are electrically connected to the first source electrode and the second source electrode in a same sub-pixel unit respectively, are a same data line.

Combined with the first embodiment of the first aspect, in the third embodiment, the first gate line and the second gate line are disposed in parallel with each other and disposed in a same layer.

In the fourth embodiment of the first aspect, the first gate electrode and the second gate electrode are disposed in a same layer; and the first source electrode, the first drain electrode, the second source electrode and the second drain electrode are disposed in a same layer.

In the fifth embodiment of the first aspect, all of the first slits are arranged in a same direction; and all of the second slits are arranged in the same direction.

In the sixth embodiment of the first aspect, the first slits are arranged in at least two directions; and the second slits are arranged in the same directions as the first slits.

Combined with the above embodiments of the first aspect, in the seventh embodiment, each of the sub-pixel units further comprises a common electrode; a distance between the common electrode and the first pixel electrode is different from a distance between the common electrode and the second pixel electrode. In some embodiments, the common electrode is configured to respectively produce electric fields with the first pixel electrode and the second pixel electrode.

In a second aspect, a display panel is provided, and the display panel comprises an array substrate, an opposite substrate and a liquid crystal layer between the array substrate and the opposite substrate; the display panel further comprises a common electrode disposed on the array substrate or on the opposite substrate; and the array substrate is the array substrate according to the first aspect.

In the first embodiment of the second aspect, the array substrate does not comprise any common electrode; and the opposite substrate comprises the common electrode. In some embodiments, a distance between the first pixel electrode and the common electrode is longer than a distance between the second pixel electrode and the common electrode, or the distance between the second pixel electrode and the common electrode is longer than the distance between the first pixel electrode and the common electrode.

In a third aspect, a method for manufacturing the array substrate is provided, and the method comprises: forming the first thin film transistor and the second thin film transistor in each sub-pixel unit in a same process, wherein the first thin film transistor comprises the first gate electrode, the first source electrode and the first drain electrode, and the second thin film transistor comprises the second gate electrode, the second source electrode and the second drain electrode; and forming the first pixel electrode electrically connected to the first drain electrode, the second pixel electrode electrically connected to the second drain electrode, wherein the first pixel electrode and the second pixel electrode are disposed in different layers and insulated from each other. In some embodiments, a plurality of first slits are formed on the first pixel electrode; a plurality of second slits are formed on the second pixel electrode; and the first slit and the second slit are disposed staggered with each other.

In the first embodiment of the third aspect, the first gate electrode is electrically connected to a first gate line, and the second gate electrode is electrically connected to a second gate line; the first source electrode is electrically connected to a first data line, and the second source electrode is electrically connected to a second data line; and the first gate line and the second gate line are disposed in parallel with each other, and are formed in a same process as the first gate electrode and the second gate electrode.

Combined with the first embodiment of the third aspect, in the second embodiment, the first data line and the second data line, which are electrically connected to the first source electrode and the second source electrode in a same sub-pixel unit respectively, are a same data line.

In a fourth aspect, a driving method for the display panel is provided. If a distance between the first pixel electrode and a common electrode is longer than a distance between the second pixel electrode and the common electrode, the driving method comprises: in a first frame, inputting scan signals to first gate lines line by line, so as to switch on the first thin film transistors row by row, and inputting positive polarity data signals to the first pixel electrodes connected to the first thin film transistors which are switched on through data lines electrically connected to the first source electrodes; in a second frame, inputting scan signals to second gate lines line by line, so as to switch on the second thin film transistors row by row, and inputting negative polarity data signals to the second pixel electrodes connected to the second thin film transistors which are switched on through data lines electrically connected to the second source electrodes; or if the distance between the first pixel electrode and the common electrode is shorter than the distance between the second pixel electrode and the common electrode, the driving method comprises: in the first frame, inputting scan signals to second gate lines line by line, so as to switch on the second thin film transistors row by row, and inputting positive polarity data signals to the second pixel electrodes connected to the second thin film transistors which are switched on through data lines electrically connected to the second source electrodes; in the second frame, inputting scan signals to first gate lines line by line, so as to switch on the first thin film transistors row by row, and inputting negative polarity data signals to the first pixel electrodes connected to the first thin film transistors which are switched on through data lines electrically connected to the first source electrodes; and the first frame and the second frame are adjacent frames. It should be noted that, the "the first frame and the second frame are adjacent frames" herein means the second frame is an adjacent frame following the first frame in time.

Embodiments of the present disclosure provide an array substrate and a manufacturing method thereof, and a display panel and a driving method thereof. Through disposing the first thin film transistor, the second thin film transistor, the first pixel electrode electrically connected to the first drain electrode of the first thin film transistor and the second pixel electrode electrically connected to the second drain electrode of the second thin film transistor in each sub-pixel unit, the first thin film transistor or the second thin film transistor in a same sub-pixel unit can be switched on in different frames according to requirement, so as to allow the first pixel electrode or the second pixel electrode to receive a positive polarity or negative polarity data signal.

Because a vertical distance exists between the first pixel electrode and the second pixel electrode, when electric fields appear between the first pixel electrode and the common electrode and between the second pixel electrode and the common electrode, the electric field intensity between the second pixel electrode, for instance, which is closer to the common electrode, and the common electrode is stronger than that between the first pixel electrode, for instance, which is farther from the common electrode, and the common electrode. On this basis, when inputting the positive polarity voltage signal to the data line connected to the first source electrode and inputting the equal negative polarity voltage signal to the data line connected to the second source electrode, although the absolute value of the negative polarity voltage received by the second pixel electrode is smaller than the absolute value of the positive polarity voltage received by the first pixel electrode eventually, because the second pixel electrode is closer to the common electrode than the first pixel electrode, the electric field intensity between the second pixel electrode and the common electrode tends to be equal to that between the first pixel electrode and the common electrode. Thus, the application of the array substrate to liquid crystal display devices eventually makes the working voltages of the liquid crystal in the positive frame and negative frame tend to be equal, which alleviates such problems as flicker and residual image.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIG. 10 is a flow diagram of a method for manufacturing the array substrate according to an embodiment of the present disclosure;

FIG. 11 is a first flow diagram of a method for driving the display panel according to an embodiment of the present disclosure; and FIG. 12 is a second flow diagram of a method for driving the display panel according to an embodiment of the present disclosure.

REFERENCE NUMERAL

01—array substrate; 02—opposite substrate; 03—liquid crystal layer; 10—base substrate; 20—sub-pixel unit; 201— first thin film transistor; 202—first pixel electrode; 203—common electrode; 204—first gate line; 205—data line; 206—second thin film transistor; 207—second pixel electrode; 208—second gate line; 2011—first gate electrode; 2012—first source electrode; 2013—first drain electrode; 2061—second gate electrode; 2062—second source electrode; 2063—second drain electrode; 2021—first slit; 2071—second slit.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The phrases "connect", "connected", etc., are not intended to define a physical connection or mechanical connection, but may include an electrical connection, directly or indirectly. "On," "under," "right," "left" and the like are used to indicate orientation or position relation according to the drawings for the purpose of convenience of description.

Figure 1:
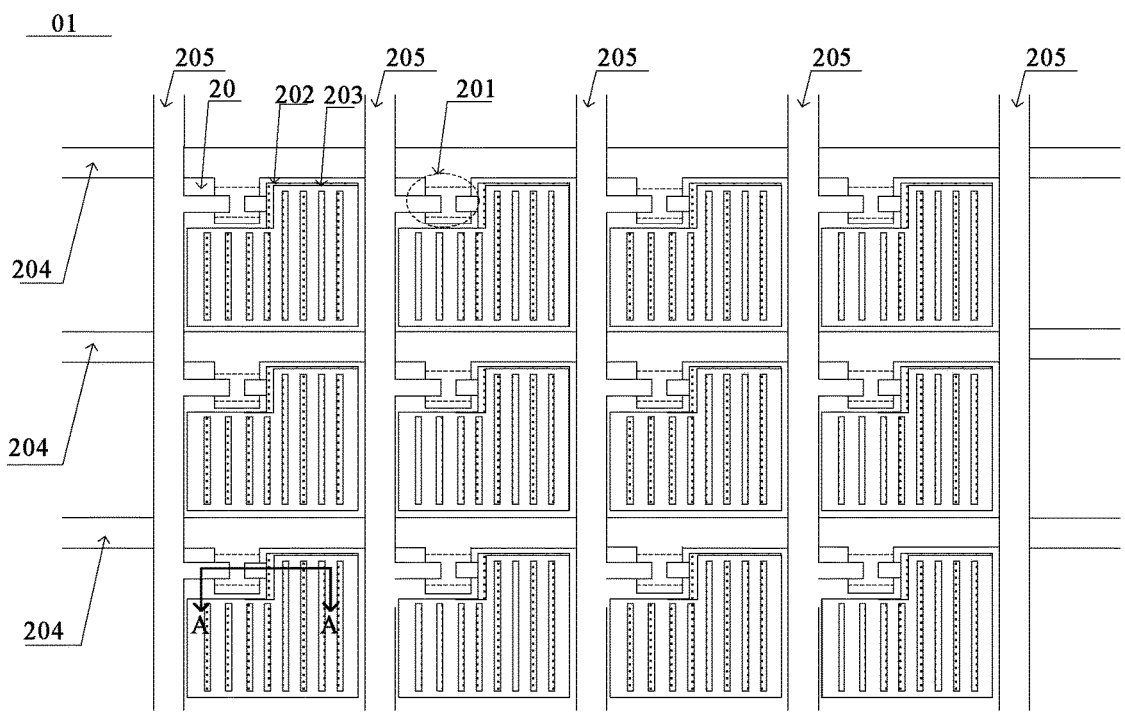
FIG. 1 is a structural schematic view of an array substrate.
Figure 2:
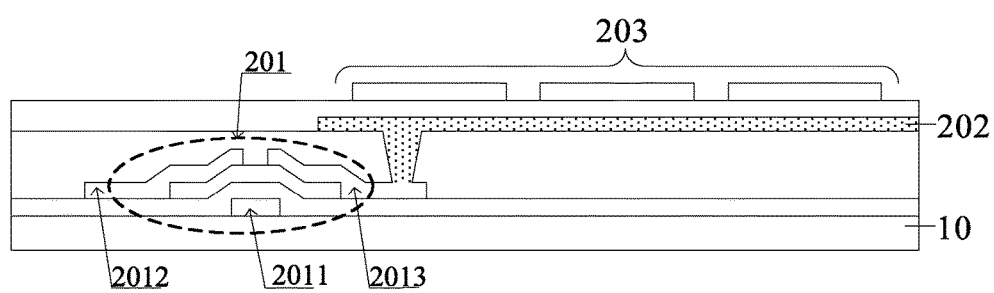
FIG. 2 is a cross-sectional view along the A-A direction in FIG. 1.

FIG. 1 and FIG. 2 illustrate a liquid crystal display panel, in which both of pixel electrodes and common electrodes are disposed on an array substrate. In FIG. 1 and FIG. 2, the array substrate 01 comprises a base substrate 10 and a plurality of sub-pixel units 20 disposed in an array on a same side of the base substrate 10; each of the sub-pixel units 20 comprises a first thin film transistor (TFT) 201, a first pixel electrode 202 electrically connected to a first drain electrode 2013 of the first thin film transistor 201, and a common electrode 203, and further comprises a first gate line 204 electrically connected to a first gate electrode 2011 of the first thin film transistor 201 and a data line 205 electrically connected to a first source electrode 2012.

The working principle of the liquid crystal display panel illustrated in FIG. 1 and FIG. 2 includes: signals are inputted over the first gate lines 204 in sequence; the first thin film transistors 201 connected to the first gate lines 204 are switched on; voltage signals provided by the data lines 205 are transmitted to the first pixel electrodes 202, so as to control the arrangement state of liquid crystal molecules by the electrical fields between the first pixel electrodes 202 and the common electrodes 203; the amount of light passing through the liquid crystal layer and emitted from the backlight is controlled, and thus the image required is displayed. In different frames, the voltages provided by the data lines 205 can be voltages with equal value and opposite polarities.

However, in processes of manufacturing an array substrate, the influences of process parameters, materials, impurity ions and the like can result in a pheromone that there is a difference (i.e., $\Delta Vp$) between the voltage actually received by the first pixel electrode 202 and the voltage provided by the data line 205, and further when the data line 205 provides voltages with opposite polarities respectively, $\Delta Vp$ mentioned above is different (when the data line 205 provides a negative voltage, $\Delta Vp$ is bigger). In this case, an electric field intensity between the first pixel electrode 202 and the common electrode 203 in a positive frame is different from the electric field intensity between the first pixel electrode 202 and the common electrode 203 in a negative frame, which can result in problems such as flicker, residual image and the like, and thus the product yield is affected.

As illustrated in FIGS. 3-6, an embodiment of the present disclosure provides an array substrate 01. The array substrate 01 comprises a base substrate 10 and a plurality of sub-pixel units 20 disposed in an array on the base substrate; each of the sub-pixel units 20 comprises a first thin film transistor 201 and a second thin film transistor 206; the first thin film transistor 201 comprises a first gate electrode 2011, a first source electrode 2012 and a first drain electrode 2013; and the second thin film transistor 206 comprises a second gate electrode 2061, a second source electrode 2062 and a second drain electrode 2063.

Based on this, each of the sub-pixel units 20 further comprises a first pixel electrode 202 electrically connected to the first drain electrode 2013, and a second pixel electrode 207 electrically connected to the second drain electrode 2063; and the first pixel electrode 202 and the second pixel electrode 207 are disposed in different layers and insulated from each other.

In the embodiment, a plurality of first slits 2021 are provided in the first pixel electrode 202; a plurality of second slits 2071 are provided in the second pixel electrode 207; and the first slit 2021 and the second slit 2071 are disposed staggered with each other.

It should be noted that, firstly, the first thin film transistor 201 comprises the first gate electrode 2011, the first source electrode 2012, and the first drain electrode 2013, and additionally further comprises a first semiconductor active layer and a gate insulating layer; and the second thin film transistor 206 comprises the second gate electrode 2061, the second source electrode 2062 and the second drain electrode 2063, and additionally further comprises a second semiconductor active layer and a gate insulating layer.

In the present application, the structures of the first thin film transistor 201 and the second thin film transistor 206 are not limited; the first thin film transistor 201 and the second thin film transistor 206 can be of a top gate type or a bottom gate type. Besides, the material of the first semiconductor active layer and the second semiconductor active layer is not limited; the material can be a semiconducting material such as amorphous silicon, polycrystalline silicon, metallic oxide or organic material.

Secondly, the source electrode and the drain electrode of the thin film transistor according to embodiments of the present disclosure are symmetrical; thus there is no difference between the source electrode and the drain electrode. Based on this, in order to distinguish the two electrodes except for the gate electrode, one of the two electrodes is named as the source electrode, and the other of the two electrodes is named as the drain electrode.

Thirdly, the first slit 2021 and the second slit 2071 are disposed with being staggered with each other, that is, along the direction perpendicular to the array substrate 01, the projection on the base substrate 10 of the first slit 2021 and the projection on the base substrate 10 of the second slit 2071 do not overlap with each other.

Fourthly, the common electrode, which is configured to respectively produce electric fields with the first pixel electrode 202 and the second pixel electrode 207, can be disposed on the array substrate 01 or not. When the common electrode is not disposed on the array substrate 01, the common electrode can be disposed on the opposite substrate of the liquid crystal display device, and the opposite substrate is configured to be cell-assembled with the array substrate 01.

An embodiment of the present disclosure provides an array substrate 01. Through disposing the first thin film transistor 201, the second thin film transistor 206, the first pixel electrode 202 electrically connected to the first drain electrode 2013 of the first thin film transistor 201 and the second pixel electrode 207 electrically connected to the second drain electrode 2063 of the second thin film transistor 206 in each sub-pixel unit 20, the first thin film transistor 201 or the second thin film transistor 206 in a same sub-pixel unit 20 can be switched on in different frames according to requirement, so as to allow the first pixel electrode 202 or the second pixel electrode 207 to receive a data signal of a positive polarity or negative polarity.

Based on this, because a vertical distance exists between the first pixel electrode 202 and the second pixel electrode 207, when electric fields appear between the first pixel electrode 202 and the common electrode and between the second pixel electrode 207 and the common electrode, the electric field intensity between the second pixel electrode 207, for instance, which is closer to the common electrode, and the common electrode 203 is stronger than that between the first pixel electrode 202, for instance, which is farther from the common electrode 203, and the common electrode 203. On this basis, when the positive polarity voltage signal is input over the data line 205 connected to the first source electrode 2012 and an equal negative polarity voltage signal is input over the data line 205 connected to the second source electrode 2062, although the absolute value of the negative polarity voltage received by the second pixel electrode 207 is smaller than the absolute value of the positive polarity voltage received by the first pixel electrode 202 eventually, because the second pixel electrode 207 is closer to the common electrode than the first pixel electrode 202, the electric field intensity between the second pixel electrode 207 and the common electrode tends to be equal to that between the first pixel electrode 202 and the common electrode. Thus, the application of the array substrate to a liquid crystal display device eventually makes the working voltages of the liquid crystal in the positive frame and the negative frame tend to be equal, which alleviates such problems as flicker, residual image or the like.

Of course, if the first pixel electrode 202 is closer to the common electrode, the electric field intensity between the first pixel electrode 202 and the common electrode is stronger than that between the second pixel electrode 207, which is farther from the common electrode, and the common electrode. On this basis, when a positive polarity voltage signal is input over the data line 205 connected to the second source electrode 2062 and an equal negative polarity voltage signal is input over the data line 205 connected to the first source electrode 2012, although the absolute value of the negative polarity voltage received by first pixel electrode 202 is smaller than the absolute value of positive polarity voltage received by the second pixel electrode 207 eventually, because the first pixel electrode 202 is closer to the common electrode than the second pixel electrode 207, the electric field intensity between the first pixel electrode 202 and the common electrode tends to be equal to that between the second pixel electrode 207 and the common electrode. Thus, the application of the array substrate to liquid crystal display devices eventually makes the working voltages of the liquid crystal in the positive frame and the negative frame tend to be equal, which alleviates such problems as flicker, residual image or the like.

Figure 4:
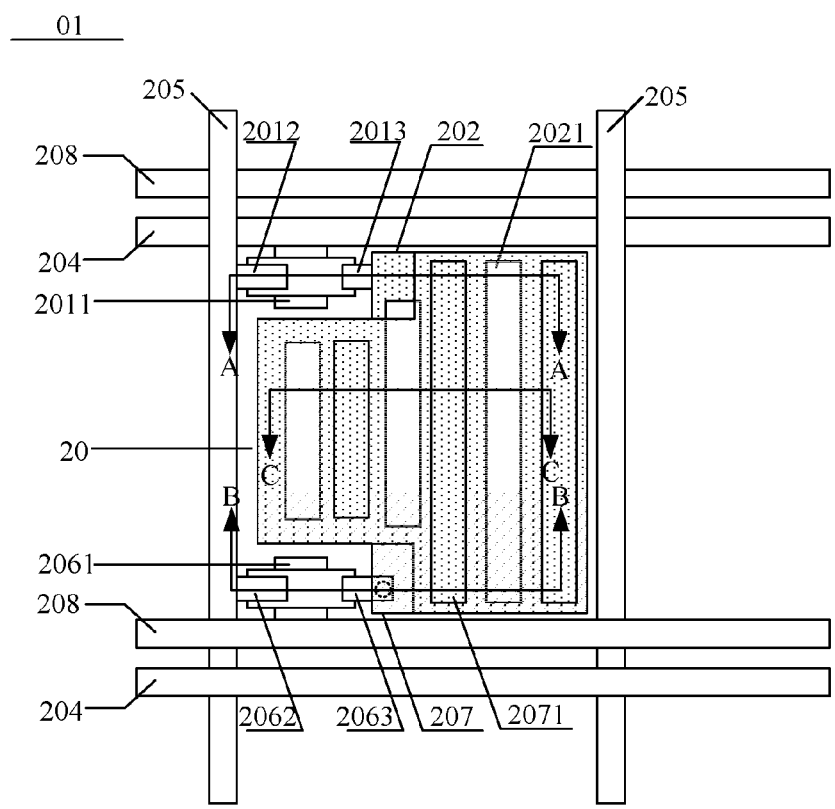
FIG. 4 is a structural schematic view of an array substrate according to an embodiment of the present disclosure.
Figure 5:
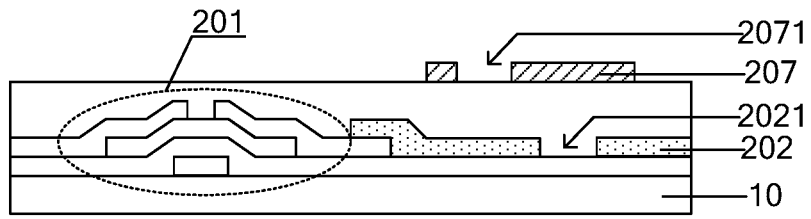
FIG. 5 is a cross-sectional view along the A-A direction in FIG. 4.
Figure 6:
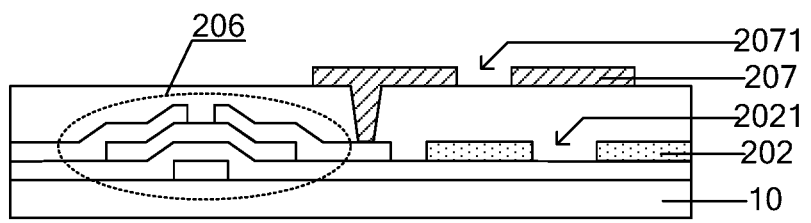
FIG. 6 is a cross-sectional view along the B-B direction in FIG. 4.

As illustrated in FIG. 4, the first gate electrode 2011 can be electrically connected to a first gate line 204; and the second gate electrode 2061 can be electrically connected to a second gate line 208. The first source electrode 2012 can be electrically connected to a first data line; and the second source electrode 2062 can be electrically connected to a second data line.

Through inputting a scan signal to the first gate line 204, the first thin film transistor 201 can be switched on or off. When the first thin film transistor 201 is switched on, through inputting a data signal to the first data line, the signal can be transmitted to the first pixel electrode 202.

Through inputting a scan signal to the second gate line 208, the second thin film transistor 206 can be switched on or off. When the second thin film transistor 206 is switched on, through inputting a data signal to the second data line, the signal can be transmitted to the second pixel electrode 207.

It should be noted that, the first data line and the second data line may be a same data line or may be different data lines. The first data line and the second data line are the same data line 205, which is taken as an example in all figures of the present disclosure for illustration.

In addition, the first thin film transistors 201 of the sub-pixel units 20 in each row, for instance, are electrically connected to one first gate line 204; and the second thin film transistors 206 of the sub-pixel units 20 in each row, for instance, are electrically connected to one second gate line 208.

The first thin film transistors 201 of the sub-pixel units 20 in each column, for instance, are electrically connected to one first data line; and the second thin film transistors 206 of the sub-pixel units 20 in each column, for instance, are electrically connected to one second data line.

Figure 3:
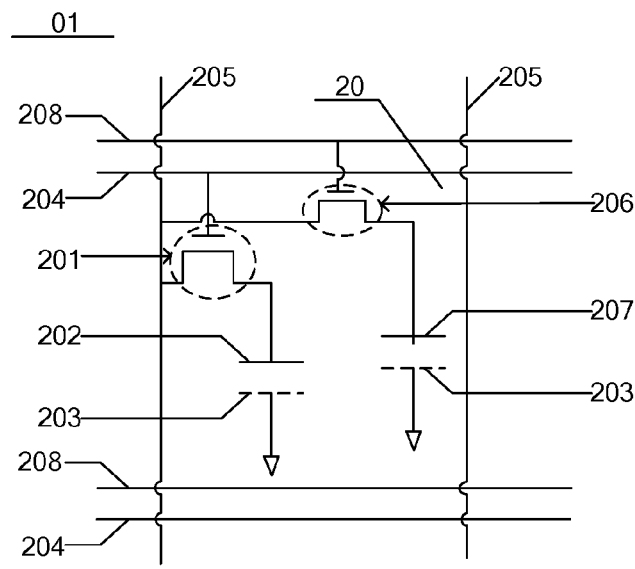
FIG. 3 is a connection schematic view of components of an array substrate according to an embodiment of the present disclosure.

In consideration that the first thin film transistor 201 and the second thin film transistor 206 are not switched on at a same time in each frame, that is, the first pixel electrode 202 and the second pixel electrode 207 do not work at a same time, therefore, for example, as illustrated in FIG. 3 and FIG. 4, in an embodiment of the present disclosure, the first source electrode 2012 and the second source electrode 2062 in the same sub-pixel unit 20 are electrically connected to the same data line 205. That is, the first data line and the second data line, which are electrically connected to the first source electrode 2012 and the second source electrode 2062 in the same sub-pixel unit 20 respectively, are the same data line 205 actually.

This configuration can prevent the wiring density of the array substrate 01 from being too tight due to the increasing of the data lines 205, and the complex manufacturing processes can be avoided as well.

In some embodiments, as illustrated in FIG. 4, the first gate line 204 and the second gate line 208 are disposed in parallel with each other and disposed in a same layer.

That is, the first gate line 204 and the second gate line 208 are formed in the same patterning process. In this way, the increasing of patterning processes can be avoided.

In some embodiments, the first gate electrode 2011 and the second gate electrode 2061 are disposed in a same layer; and the first source electrode 2012, the first drain electrode 2013, the second source electrode 2062 and the second drain electrode 2063 are disposed in a same layer.

That is, the first gate electrode 2011 and the second gate electrode 2061 are formed in the same patterning process. The first source electrode 2012, the first drain electrode 2013, the second source electrode 2062 and the second drain electrode 2063 are formed in the same patterning process.

Of course, the first gate line 204 and the second gate line 208 can be formed while the first gate electrode 2011 and the second gate electrode 2061 are formed. In this configuration, along the direction of the data line 205, one first gate line 204 and one second gate line 208 are disposed between two adjacent sub-pixel units 20.

In addition, the data line 205 can be formed while the first source electrode 2012, the first drain electrode 2013, the second source electrode 2062 and the second drain electrode 2063 are formed.

Based on the embodiments mentioned above, optionally, referring to FIG. 4, all of the first slits 2021 are arranged in a same direction; and all of the second slits 2071 are arranged in a same direction.

Based on the above, the electrical field produced by the first pixel electrode 202 which is provided with the first slits 2021 arranged in the same direction and the common electrode, and the electrical field produced by the second pixel electrode 207 which is provided with the second slit 2071 arranged in the same direction and the common electrode, can allow liquid crystal molecules to be arranged in a single domain manner.

Figure 7A:
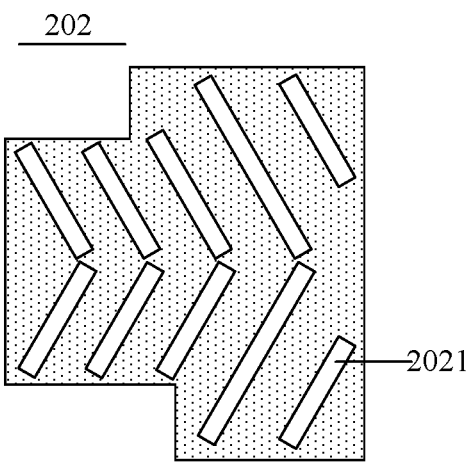
FIG. 7a is a structural schematic view of a first pixel electrode according to an embodiment of the present disclosure.
Figure 7B:
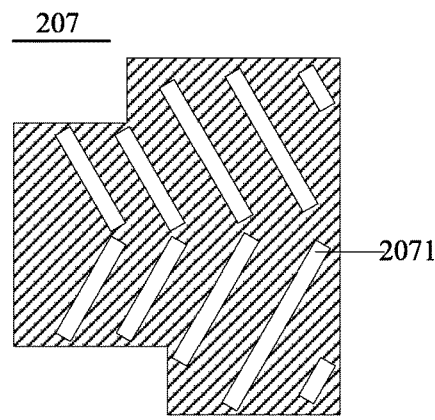
FIG. 7b is a structural schematic view of a second pixel electrode according to an embodiment of the present disclosure.

Optionally, as illustrated in FIG. 7a and FIG. 7b, the first slits 2021 are arranged in at least two directions; and the second slits 2071 are arranged in the same directions as the first slits 2021.

It should be noted that, in FIG. 7a and FIG. 7b, the first slits 2021 and the second slits 2071 are arranged in two directions, which is only taken as an example for illustration and is not used to limit the embodiments of the present disclosure herein; the first slits 2021 and the second slits 2071 can be arranged in more directions, for instance, in four directions or in eight directions, which can be set according to the practical situation.

The second slits 2071 are arranged in the same direction as the first slits 2021. That is, when the first slits 2021 are arranged in plural directions, the second slits 2071 are also arranged in the plural directions. For example, when the first slits 2021 are arranged in two directions, the second slits 2071 are also arranged in the two directions; when the first slits 2021 are arranged in four directions, the second slits 2071 are also arranged in the four directions; when the first slits 2021 are arranged in eight directions, the second slits 2071 are also arranged in the eight directions.

Based on the above, the electrical field produced by the first pixel electrode 202 which is provided with the first slits 2021 arranged in different directions and the common electrode, and the electrical field produced by the second pixel electrode 207 which is provided with the second slit 2071 arranged in different directions and the common electrode, can allow liquid crystal molecules to be arranged in a multi-domains manner. This configuration can increase the viewing angle of the liquid crystal display device.

Figure 8:
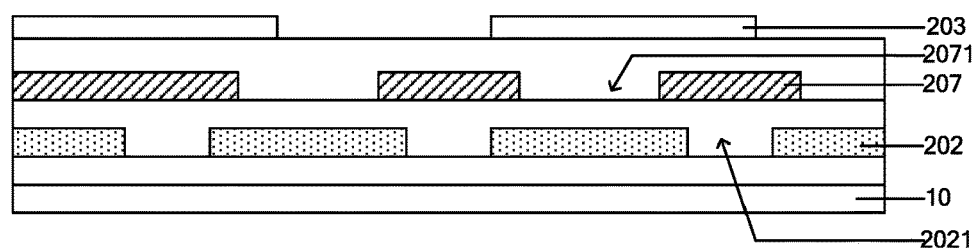
FIG. 8 is a cross-sectional view along the C-C direction in FIG. 4 when the array substrate comprises a common electrode.

Based on the embodiments mentioned above, the common electrode can be disposed on the array substrate 01, i.e., as illustrated in FIG. 8, each of the sub-pixel units 20 further comprises a common electrode 203; the common electrode 203 is configured to respectively produce electric fields with the first pixel electrode 202 and the second pixel electrode 207; and a distance between the common electrode 203 and the first pixel electrode 202 is different from a distance between the common electrode 203 and the second pixel electrode 207.

The location of the common electrode 203 is only schematically illustrated in FIG. 8, which is not used to limit the embodiments of the present disclosure herein. The common electrode 203 also can be disposed at another location, as long as the common electrode 203 can produce electrical field with the first pixel electrode 202 or the second pixel electrode 207.

Figure 9:
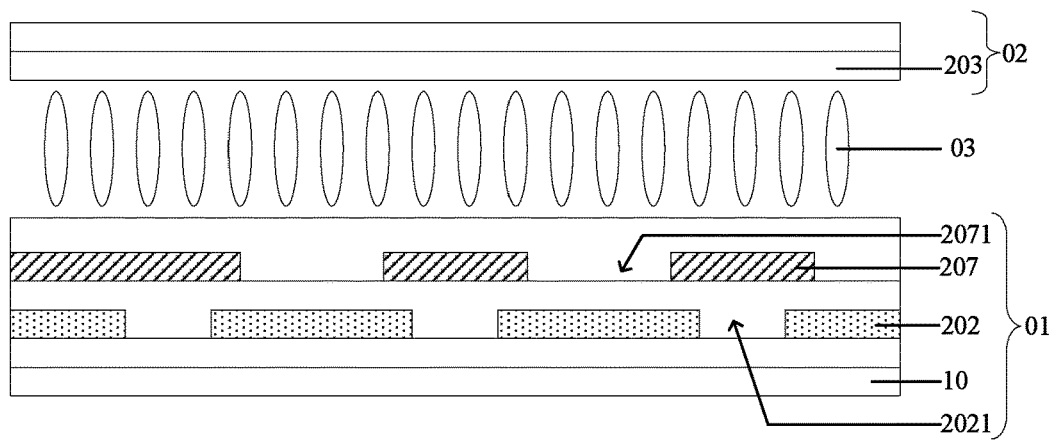
FIG. 9 is a structural schematic view of a display panel according to an embodiment of the present disclosure.

An embodiment of the present disclosure further provides a display panel. As illustrated in FIG. 9, the display panel comprises any array substrate 01 mentioned above, an opposite substrate 02 and a liquid crystal layer 03 disposed between the array substrate 01 and the opposite substrate 02. The common electrode 203 is disposed on the array substrate 01 or on the opposite substrate 02.

Optionally, as illustrated in FIG. 9, the array substrate 01 does not comprise any common electrode; and the opposite substrate 02 comprises the common electrode 203.

In addition, an embodiment of the present disclosure further provides a display device comprising the display panel mentioned above and a driving module.

The display device mentioned above can be any product or component having a display function such as liquid crystal display, liquid crystal television, digital photo frame, mobile phone, laptop computer or the like.

An embodiment of the present disclosure further provides a method for manufacturing the array substrate. As illustrated in FIG. 10, the method comprises the following steps:

S10, as illustrated in FIG. 4, forming a first thin film transistor 201 and a second thin film transistor 206 in each sub-pixel unit 20 in a same process. The first thin film transistor 201 comprises a first gate electrode 2011, a first source electrode 2012 and a first drain electrode 2013, and the second thin film transistor 206 comprises a second gate electrode 2061, a second source electrode 2062 and a second drain electrode 2063.

Here, the process of forming the first thin film transistor 201 and the second thin film transistor 206 in each sub-pixel unit 20 in the same process can specifically be conducted as follows: forming the first gate electrode 2011 and the second gate electrode 2061 in a patterning process; forming a first semiconductor active layer (not illustrated in the figure) and a second semiconductor active layer (not illustrated in the figure) in another patterning process; and forming the first source electrode 2012, the first drain electrode 2013, the second source electrode 2062 and the second drain electrode 2063 in still another patterning process.

Further, the first gate electrode 2011 can be electrically connected to a first gate line 204; the second gate electrode 2061 can be electrically connected to a second gate line 208; the first source electrode 2012 can be electrically connected to a first data line; and the second source electrode 2062 can be electrically connected to a second data line.

On this basis, for example, the first gate line 204 and the second gate line 208 are disposed in parallel with each other, and are formed in the same process with the first gate electrode 2011 and the second gate electrode 2061.

Further, for example, the first data line and the second data line, which are electrically connected to the first source electrode 2012 and the second source electrode 2062 in the same sub-pixel unit 20 respectively, are a same data line 205 actually.

On this basis, for example, the data line 205 is formed while forming the first source electrode 2012, the first drain electrode 2013, the second source electrode 2062 and the second drain electrode 2063.

S11, forming the first pixel electrode 202 electrically connected to the first drain electrode 2013 and the second pixel electrode 207 electrically connected to the second drain electrode 2063. The first pixel electrode 202 and the second pixel electrode 207 are disposed in different layers and insulated from each other.

A plurality of first slits 2021 are formed in the first pixel electrode 202, a plurality of second slits 2071 are formed in the second pixel electrode 207, and the first slit 2021 and the second slit 2071 are disposed with being staggered with each other.

An embodiment of the present disclosure further provides a driving method for the display panel. If the distance between the first pixel electrode 202 and the common electrode 203 is longer than that between the second pixel electrode 207 and the common electrode 203 on the array substrate 01, as illustrated in FIG. 11, the driving method comprises the following steps:

S20, in a first frame, inputting scan signals over the first gate lines 204 line by line, so as to switch on the first thin film transistors 201 row by row, and inputting positive polarity data signals to the first pixel electrodes 202 connected to the first thin film transistors 201 which are switched on, through the data lines 205 electrically connected to the first source electrodes 2012.

S21, in a second frame, inputting scan signals over the second gate lines 208 line by line, so as to switch on the second thin film transistors 206 row by row, and inputting negative polarity data signals over the second pixel electrodes 207 connected to the second thin film transistors 206 which are switched on, through the data lines 205 electrically connected to the second source electrodes 2062.

The first frame and the second frame are adjacent frames of image.

Because a vertical distance exists between the first pixel electrode 202 and the second pixel electrode 207, when electric fields appear between the first pixel electrode 202 and the common electrode and between the second pixel electrode 207 and the common electrode, the electric field intensity between the second pixel electrode 207, which is closer to the common electrode, and the common electrode 203 is stronger than that between the first pixel electrode 202, which is farther from the common electrode 203, and the common electrode 203. On this basis, when inputting a positive polarity voltage signal to the data line 205 connected to the first source electrode 2012 and input an equal negative polarity voltage signal to the data line 205 connected to the second source electrode 2062, although the absolute value of the negative polarity voltage received by the second pixel electrode 207 is smaller than the absolute value of the positive polarity voltage received by the first pixel electrode 202 eventually, because the second pixel electrode 207 is closer to the common electrode than the first pixel electrode 202, the electric field intensity between the second pixel electrode 207 and the common electrode tends to be equal to that between the first pixel electrode 202 and the common electrode. Thus, the application of the array substrate to a liquid crystal display device eventually makes the working voltages of the liquid crystal in the positive frame and the negative frame tend to be equal, which alleviates such problems as flicker, residual image or the like.

If the distance between the first pixel electrode 202 and the common electrode 203 is shorter than the distance between the second pixel electrode 207 and the common electrode 203 on the array substrate 01, as illustrated in FIG. 12, the driving method comprises the following operations:

S30, in the first frame, inputting scan signals to second gate lines 208 line by line, so as to switch on the second thin film transistors 206 row by row, and inputting positive polarity data signals to the second pixel electrodes 207 connected to the second thin film transistors 206 which are switched on, through the data lines 205 electrically connected to the second source electrodes 2062.

S31, in the second frame, inputting scan signals to first gate lines 204 line by line, so as to switch on the first thin film transistors 201 row by row, and inputting negative polarity data signals to the first pixel electrodes 202 connected to the first thin film transistors 201 which are switched on, through the data lines 205 electrically connected to the first source electrodes 2012.

The first frame and the second frame are adjacent frames.

Because a vertical distance exists between the first pixel electrode 202 and the second pixel electrode 207, when electric fields appear between the first pixel electrode 202 and the common electrode and between the second pixel electrode 207 and the common electrode, the electric field intensity between the first pixel electrode 202, which is closer to the common electrode, and the common electrode 203 is stronger than that between the second pixel electrode 207, which is farther from the common electrode 203, and the common electrode 203. On this basis, when inputting a positive polarity voltage signal to the data line 205 connected to the second source electrode 2062 and inputting an equal negative polarity voltage signal to the data line 205 connected to the first source electrode 2012, although the absolute value of the negative polarity voltage received by first pixel electrode 202 is smaller than the absolute value of the positive polarity voltage received by the second pixel electrode 207 eventually, because the first pixel electrode 202 is closer to the common electrode than the second pixel electrode 207, the electric field intensity between the first pixel electrode 202 and the common electrode tends to be equal to that between the second pixel electrode 207 and the common electrode. Thus, the application of the array substrate to a liquid crystal display device eventually makes the working voltages of the liquid crystal in the positive frame and the negative frame tend to be equal, which alleviates such problems as flicker, residual image or the like.

What are described above is related to the illustrative embodiments of the disclosure only and not limitative to the scope of the disclosure; the scopes of the disclosure are defined by the accompanying claims.

The present application claims the priority of the Chinese Patent Application No. 201510580609.5 filed on Sep. 11, 2015, which is incorporated herein in its entirety by reference as part of the disclosure of the present application.

What is claimed is:

1. A driving method for a display panel, the display panel comprising an array substrate, an opposite substrate and a liquid crystal layer between the array substrate and the opposite substrate, and further comprising a common electrode disposed on the array substrate or on the opposite substrate, and the array substrate comprising a base substrate and a plurality of sub-pixel units disposed in array on the base substrate;

wherein each of the sub-pixel units comprises a first thin film transistor and a second thin film transistor; the first thin film transistor comprises a first gate electrode, a first source electrode and a first drain electrode; the second thin film transistor comprises a second gate electrode, a second source electrode and a second drain electrode;

each of the sub-pixel units further comprises a first pixel electrode electrically connected to the first drain electrode, a second pixel electrode electrically connected to the second drain electrode; and the first pixel electrode and the second pixel electrode are disposed in different layers and insulated from each other;

wherein if a distance between the first pixel electrode and a common electrode is longer than a distance between the second pixel electrode and the common electrode, the driving method comprises:

in a first frame, inputting scan signals to first gate lines line by line, so as to switch on the first thin film transistors row by row, and inputting positive polarity data signals to the first pixel electrodes connected to the first thin film transistors which are switched on, through data lines electrically connected to the first source electrodes;

in a second frame, inputting scan signals to second gate lines line by line, so as to switch on the second thin film transistors row by row, and inputting negative polarity data signals to the second pixel electrodes connected to the second thin film transistors which are switched on, through data lines electrically connected to the second source electrodes; or if the distance between the first pixel electrode and the common electrode is shorter than the distance between the second pixel electrode and the common electrode, the driving method comprises:

in the first frame, inputting scan signals to the second gate lines line by line, so as to switch on the second thin film transistors row by row, and inputting positive polarity data signals to the second pixel electrodes connected to the second thin film transistors which are switched on, through the data lines electrically connected to the second source electrodes;

in the second frame, inputting scan signals to the first gate lines line by line, so as to switch on the first thin film transistors row by row, and inputting negative polarity data signals to the first pixel electrodes connected to the first thin film transistors which are switched on, through the data line electrically connected to the first source electrodes; and the first frame and the second frame are adjacent frames.

2. The driving method for the display panel according to claim 1, wherein a plurality of first slits are provided in the first pixel electrode; a plurality of second slits are provided in the second pixel electrode; and the first slit and the second slit are disposed staggered with each other.

3. The driving method for the display panel according to claim 2, wherein all of the first slits are arranged in a same direction; and all of the second slits are arranged in the same direction.

4. The driving method for the display panel according to claim 2, wherein the first slits are arranged in at least two directions; and the second slits are arranged in the same directions as the first slits.

5. The driving method for the display panel according to claim 2, wherein the first gate electrode is electrically connected to a first gate line; the second gate electrode is electrically connected to a second gate line; and the first source electrode is electrically connected to a first data line; and the second source electrode is electrically connected to a second data line.

6. The driving method for the display panel according to claim 2, wherein each of the sub-pixel units further comprises a common electrode; the common electrode is configured to respectively produce electric fields with the first pixel electrode and the second pixel electrode; and a distance between the common electrode and the first pixel electrode is different from a distance between the common electrode and the second pixel electrode.

7. The driving method for the display panel according to claim 1, wherein the first gate electrode is electrically connected to a first gate line; the second gate electrode is electrically connected to a second gate line; and the first source electrode is electrically connected to a first data line; and the second source electrode is electrically connected to a second data line.

8. The driving method for the display panel according to claim 7, wherein the first data line and the second data line, which are electrically connected to the first source electrode and the second source electrode in a same sub-pixel unit respectively, are a same data line.

9. The driving method for the display panel according to claim 7, wherein the first gate line and the second gate line are disposed in parallel with each other and disposed in a same layer.

10. The driving method for the display panel according to claim 1, wherein the first gate electrode and the second gate electrode are disposed in a same layer; and the first source electrode, the first drain electrode, the second source electrode and the second drain electrode are disposed in a same layer.

11. The driving method for the display panel according to claim 1, wherein each of the sub-pixel units further comprises a common electrode; the common electrode is configured to respectively produce electric fields with the first pixel electrode and the second pixel electrode; and a distance between the common electrode and the first pixel electrode is different from a distance between the common electrode and the second pixel electrode.

12. The driving method for the display panel according to claim 1, wherein the array substrate does not comprise any common electrode; and the opposite substrate comprises the common electrode.

13. The driving method for the display panel according to claim 1, wherein a distance between the first pixel electrode and the common electrode is longer than a distance between the second pixel electrode and the common electrode, or the distance between the second pixel electrode and the common electrode is longer than the distance between the first pixel electrode and the common electrode.

* * * * *